(12) United States Patent
Danckers et al.

(10) Patent No.: US 11,569,703 B2
(45) Date of Patent: Jan. 31, 2023

(54) INTEGRATED WEDGE COOLING DISTRIBUTION PLATE AND END TURN SUPPORT

(71) Applicant: Hamilton Sundstrand Corporation, Charlotte, NC (US)

(72) Inventors: Erika M. Danckers, Rockford, IL (US); Kris H. Campbell, Poplar Grove, IL (US); Thomas Wise, Rockford, IL (US); Joseph Hong, Huntley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 111 days.

(21) Appl. No.: 17/140,649

(22) Filed: Jan. 4, 2021

(65) Prior Publication Data

US 2022/0216761 A1 Jul. 7, 2022

(51) Int. Cl.
*H02K 1/20* (2006.01)
*H02K 3/52* (2006.01)

(52) U.S. Cl.
CPC .............. *H02K 3/527* (2013.01); *H02K 1/20* (2013.01)

(58) Field of Classification Search
CPC ................................ H02K 3/527; H02K 1/20
See application file for complete search history.

(56) References Cited

U.S. PATENT DOCUMENTS

| 3,597,646 | A | * | 8/1971 | Lawrenson | H02K 19/14 |
| | | | | | 310/211 |
| 6,933,648 | B2 | | 8/2005 | Buchan et al. | |
| 7,015,616 | B2 | | 3/2006 | Doherty et al. | |
| 9,166,454 | B2 | * | 10/2015 | Chun | H02K 3/00 |
| 9,653,958 | B2 | * | 5/2017 | Patel | H02K 3/527 |
| 10,148,145 | B2 | | 12/2018 | Yang et al. | |
| 2003/0094872 | A1 | | 5/2003 | Tornquist et al. | |

FOREIGN PATENT DOCUMENTS

| EP | 3713051 A1 | 9/2020 |
| WO | 2008019945 A1 | 2/2008 |

OTHER PUBLICATIONS

Extended Search Report for European Application No. 21215267.2 dated May 25, 2022.

* cited by examiner

*Primary Examiner* — Dang D Le
(74) *Attorney, Agent, or Firm* — Cantor Colburn LLP

(57) ABSTRACT

A rotor assembly of a generator includes a rotor core including a plurality of core poles defining a plurality of core slots therebetween. The core poles extend from a first axial end of the rotor core to a second axial end of the rotor core. A rotor winding is installed to the rotor core and has a plurality of core segments located in the plurality of core slots, and a plurality of end turns connecting the plurality of core segments. An end plate is located at at least one of the first axial end or the second axial end and includes a plate portion and a plurality of wedge ends extending from the plate portion. Each wedge end is located at a corresponding core slot. The end plate is supportive of the plurality of end turns of the rotor winding.

13 Claims, 3 Drawing Sheets

INTEGRATED WEDGE COOLING DISTRIBUTION PLATE AND END TURN SUPPORT

BACKGROUND

Electrical systems, such as aircraft electrical systems, commonly include generators. The generators provide electrical power to electrical devices connected to the electrical systems, generally by rotating magnetic elements relative to a stationary winding. As the magnetic elements rotate magnetic flux is communicated between the magnetic elements and the stationary winding, the magnetic flux inducing current flow in the stationary winding for powering electrical devices connected to the generator.

In some generators the magnetic flux is provided by flowing an electric current through coils of wire wrapped about a ferromagnetic structure, referred to as a rotor core. The current flow magnetizes the portion of the rotor core the wire wraps about to define a magnetic pole including the rotor core. Once magnetized, the pole communicates magnetic flux to the stationary winding, the magnetic flux in turn inducing current flow in the stationary winding.

In high power generators, cooling fluid is circulated through wedges installed in the rotor core to support the rotor coil. The cooling fluid acts to remove heat generated by electrical losses from the rotor winding and the rotor core. Aluminum is typically utilized for the wedges, due to the high conductivity of the material, but the aluminum material may have insufficient strength to withstand loading of the wedges, especially at the end turn portions of the rotor winding.

BRIEF DESCRIPTION

In one embodiment, a rotor assembly of a generator includes a rotor core including a plurality of core poles defining a plurality of core slots therebetween. The plurality of core poles extend from a first axial end of the rotor core to a second axial end of the rotor core, opposite the first axial end. A rotor winding is installed to the rotor core. The rotor winding has a plurality of core segments located in the plurality of core slots, and a plurality of end turns connecting the plurality of core segments. The end turns are at least partially located outside of the first axial end and/or the second axial end of the rotor core. An end plate is located at at least one of the first axial end or the second axial end. The end plate includes a plate portion and a plurality of wedge ends extending from the plate portion. Each wedge end of the plurality of wedge ends located at a corresponding core slot of the plurality of core slots. The end plate is supportive of the plurality of end turns of the rotor winding.

Additionally or alternatively, in this or other embodiments the rotor assembly includes a plurality of wedges. Each wedge is located in a core slot of the plurality of core slots and supportive of the plurality of core segments of the rotor winding.

Additionally or alternatively, in this or other embodiments the plurality of wedges are formed from a first material, and the end plate is formed from a second material different from the first material.

Additionally or alternatively, in this or other embodiments the wedge end has a different axial cross section than the wedge.

Additionally or alternatively, in this or other embodiments the wedge includes a cooling flow channel to direct a cooling fluid through the wedge.

Additionally or alternatively, in this or other embodiments the end plate includes a plurality of fluid passages. Each fluid passage extends through a wedge end to fluidly connect the fluid passage to the cooling flow channel.

Additionally or alternatively, in this or other embodiments the end plate includes a fluid manifold connected to the plurality of fluid passages to distribute the cooling fluid to the plurality of fluid passages.

Additionally or alternatively, in this or other embodiments the plurality of wedges are formed from an aluminum material.

Additionally or alternatively, in this or other embodiments the end plate is formed from one of a titanium or steel material.

In another embodiment, a generator includes a stator including a stator winding, and a rotor assembly defining an air gap between the rotor assembly and the stator, the rotor assembly rotatable about a central axis. The rotor assembly includes a rotor core including a plurality of core poles defining a plurality of core slots therebetween. The plurality of core poles extend from a first axial end of the rotor core to a second axial end of the rotor core, opposite the first axial end. A rotor winding is installed to the rotor core. The rotor winding has a plurality of core segments located in the plurality of core slots and a plurality of end turns connecting the plurality of core segments. The end turns are at least partially located outside of the first axial end and/or the second axial end of the rotor core. An end plate is located at at least one of the first axial end or the second axial end. The end plate includes a plate portion and a plurality of wedge ends extending from the plate portion. Each wedge end of the plurality of wedge ends is located at a corresponding core slot of the plurality of core slots. The end plate is supportive of the plurality of end turns of the rotor winding.

Additionally or alternatively, in this or other embodiments the generator includes a plurality of wedges. Each wedge is located in a core slot of the plurality of core slots and supportive of the plurality of core segments of the rotor winding.

Additionally or alternatively, in this or other embodiments the plurality of wedges are formed from a first material, and the end plate is formed from a second material different from the first material.

Additionally or alternatively, in this or other embodiments the wedge end has a different axial cross section than the wedge.

Additionally or alternatively, in this or other embodiments the wedge includes a cooling flow channel to direct a cooling fluid through the wedge.

Additionally or alternatively, in this or other embodiments the end plate includes a plurality of fluid passages, each fluid passage extending through a wedge end to fluidly connect the fluid passage to the cooling flow channel.

Additionally or alternatively, in this or other embodiments the end plate includes a fluid manifold connected to the plurality of fluid passages to distribute the cooling fluid to the plurality of fluid passages.

Additionally or alternatively, in this or other embodiments the plurality of wedges are formed from an aluminum material.

Additionally or alternatively, in this or other embodiments the end plate is formed from one of a titanium or steel material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
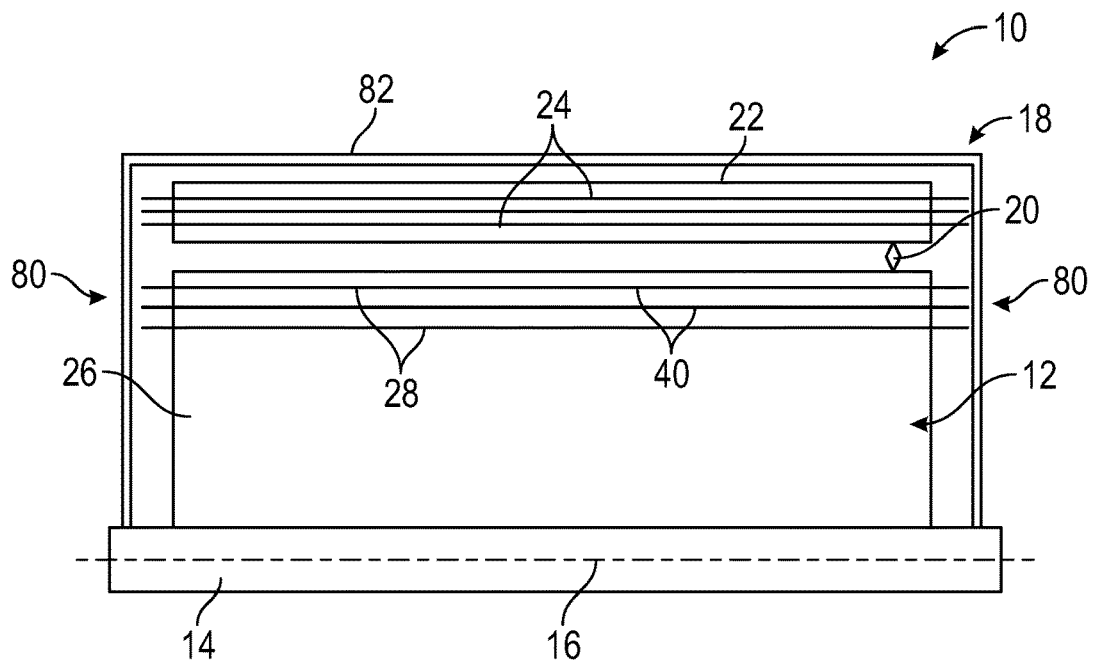
FIG. 1 is a schematic illustration of an embodiment of a generator.

Referring now to FIG. 1, illustrated is an embodiment of an electric machine, for example, a generator 10. The generator 10 includes a rotor assembly 12 mounted to a shaft 14 located at a central axis 16 and configured to rotated about the central axis 16. A stator 18 is located radially outboard of the rotor assembly 12, defining an air gap 20 between the stator 18 and the rotor assembly 12. The stator 18 includes a stator core 22 and a plurality of stator windings 24 extending through the stator core 22, which are electromagnetically interactive with the rotor assembly 12. The rotor assembly 12 and the stator 18 are located inside of a housing 82.

In operation, rotational energy is input into the rotor assembly 12 via the shaft 14 to rotate the rotor assembly 12 about the central axis 16. The rotation of the rotor assembly 12 energizes the stator windings 24 via electromagnetic interaction between the rotor assembly 12 and the stator windings 24 across the air gap 20 and generates electrical energy which is output from the generator 10.

Figure 2:
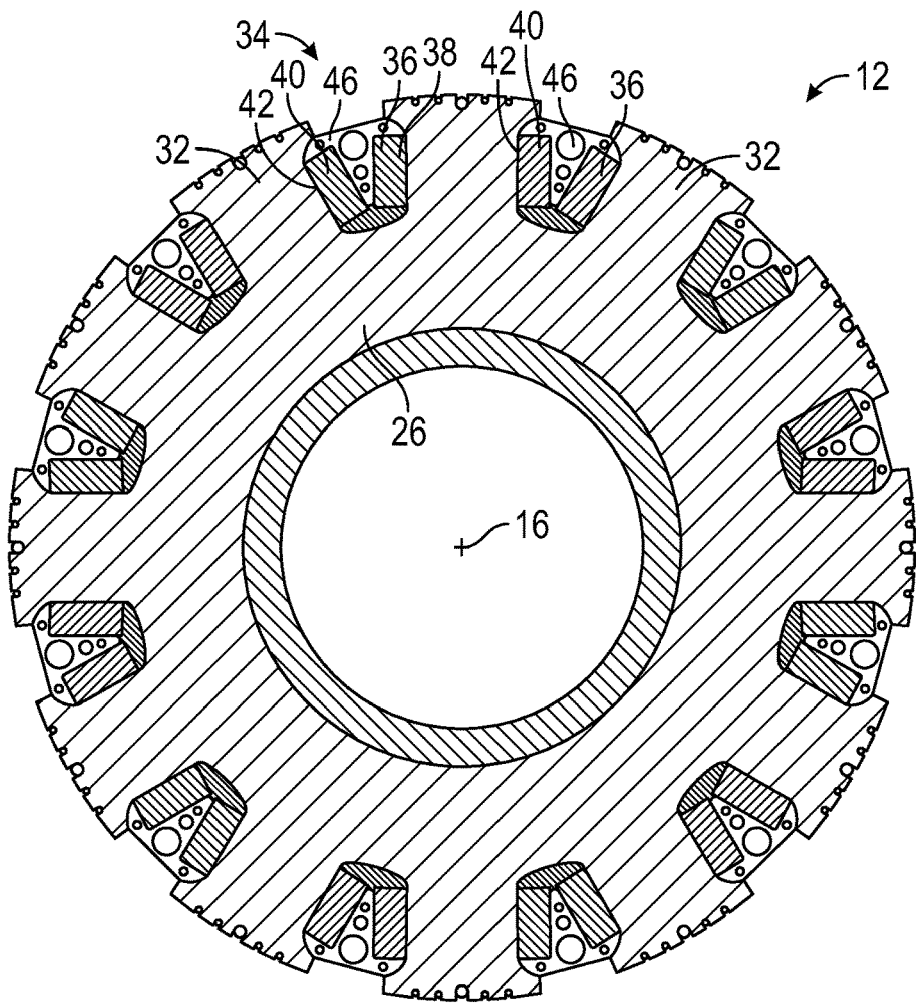
FIG. 2 is a cross-sectional view of an embodiment of a rotor assembly.

The rotor assembly 12 includes a rotor core 26 mounted on the shaft 14, and one or more rotor windings 28 assembled to the rotor core 26 and is illustrated in more detail in FIG. 2. The rotor core 26 is formed from a ferromagnetic material, and in some embodiments is formed from a plurality of laminations axially stacked along the central axis 16. The rotor core 26 includes a plurality of core poles 32 arranged circumferentially around the rotor core 26, with circumferentially adjacent core poles 32 spaced by a core slot 34. The core poles 32 and the core slots 34 are in an alternating arrangement around a circumference of the rotor core 26. At each core pole 32, the rotor winding 28 includes a plurality of first core segments 36 located at a first pole side 38, and a plurality of second core segments 40 located at a second pole side 42. The first core segments 36 and second core segments 40 wrap around the core pole 32 via an end turn 80 located at an axial end of the rotor core 26, as best shown in FIG. 1.

Figures 3, 4:
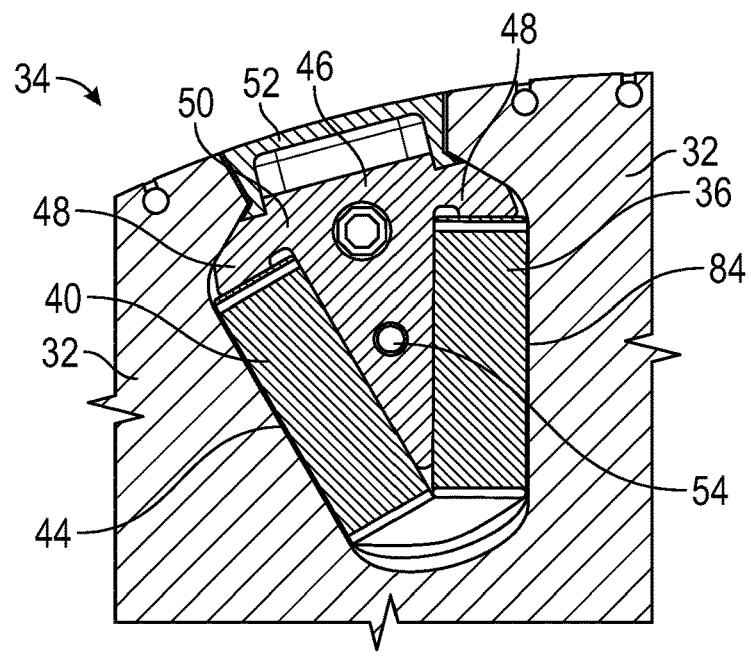
FIG. 3 is an illustration of an exemplary core slot of a rotor assembly.
FIG. 4 is another cross-sectional view of an embodiment of a rotor assembly.

Referring now to FIG. 3, an exemplary core slot 34 with adjacent core poles 32 is illustrated. A plurality of first core segments 36 are located at a first side 84 of the core slot 34 and a plurality of second core segments 40 are located at a second side 44 of the core slot 34. A wedge 46 is installed in the core slot 34 between the first core segments 36 and the second core segments 40 to retain the first core segments 36 and the second core segments 40 in their desired positions. The wedge 46 includes wedge wings 48 extending from a wedge body 50, with the wedge wings 48 abutting respective core poles 32 and core segments 36, 40. The wedge 46 may further include a wedge cap 52 installed to the wedge 46 at an outer periphery of the rotor core 26 to retain the wedge 46 in the core slot 34. The wedge body 50 includes one or more cooling flow channels 54, through which a cooling fluid, such as air or a liquid coolant are passed through. The wedge 46 is formed from a thermally conductive material, such as aluminum. Thermal energy from the core segments 36, 40 is conducted into the wedge 46 and transferred to the cooling fluid at the cooling flow channels 54, and then removed from the rotor assembly 12 with the cooling fluid.

Referring now to FIG. 4, the rotor assembly 12 further includes an end plate 56 installed at each axial end 58 of the rotor assembly 12. The end plates 56 include a include wedge ends 60 which are installed in the core slots 34 and abut the wedges 46. In some embodiments the wedge ends 60 extend into the core slots 34 in the range of between.

Figure 5:
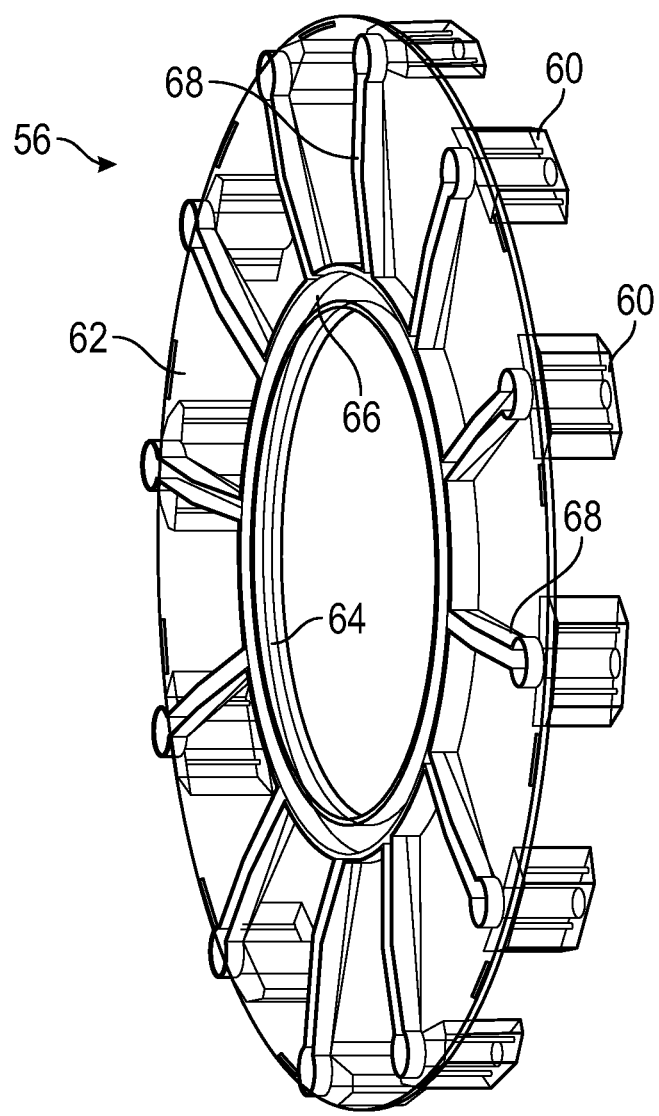
FIG. 5 is a perspective view of an embodiment of an end plate of a rotor assembly.

Referring now to FIG. 5, an exemplary end plate 56 is illustrated. The end plate 56 is formed from a material such as titanium, steel, or a nickel-based super alloy. The end plate 56 is configured with features to distribute the cooling fluid to the cooling flow channels 54, as well as providing support of the end turns 80 of the rotor winding 28. The end plate 56 includes a plate portion 62 with the wedge ends 60 extending from the plate portion 62, and the plate portion 62 circumferentially and radially connecting the wedge ends 60. The plate portion 62 includes a fluid manifold 64 connected to a fluid port 66, and a plurality of fluid passages 68 extending from the fluid manifold 64. The fluid passages 68 extend from the fluid manifold 64 and through the wedge ends 60 to communicate with the cooling flow channels 54. In operation, cooling fluid flows from the fluid manifold 64 through the plurality of fluid passages 68 and through the cooling flow channels 54.

The configurations presented herein retain the thermal benefits of the wedges 46 but improve the strength at the wedge ends 60 to support the end turns 80 and resolve stress issues at the end turns 80. Additionally, the configuration of the wedge ends 60 can be modified as needed to better support the end turns 80, without having to change the configuration of the wedges 46 in their entirety.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying

What is claimed is:

1. A rotor assembly of a generator, comprising:
a rotor core including a plurality of core poles defining a plurality of core slots therebetween, the plurality of core poles extending from a first axial end of the rotor core to a second axial end of the rotor core, opposite the first axial end;
a rotor winding installed to the rotor core, the rotor winding having:
a plurality of core segments disposed in the plurality of core slots: and
a plurality of end turns connecting the plurality of core segments, the end turns at least partially disposed outside of the first axial end and/or the second axial end of the rotor core;
an end plate disposed at at least one of the first axial end or the second axial end, the end plate including:
a plate portion; and
a plurality of wedge ends extending from the plate portion, each wedge end of the plurality of wedge ends disposed at a corresponding core slot of the plurality of core slots, the end plate supportive of the plurality of end turns of the rotor winding;
a plurality of wedges, each wedge disposed in a core slot of the plurality of core slots and supportive of the plurality of core segments of the rotor winding;
wherein the plurality of wedges are formed from a first material, and the end plate is formed from a second material different from the first material.

2. The rotor assembly of claim 1, wherein the wedge includes a cooling flow channel to direct a cooling fluid through the wedge.

3. The rotor assembly of claim 1, wherein the plurality of wedges are formed from an aluminum material.

4. The rotor assembly of claim 1, wherein the end plate is formed from one of a titanium or steel material.

5. A rotor assembly of a generator, comprising:
a rotor core including a plurality of core poles defining a plurality of core slots therebetween, the plurality of core poles extending from a first axial end of the rotor core to a second axial end of the rotor core, opposite the first axial end;
a rotor winding installed to the rotor core, the rotor winding having:
a plurality of core segments disposed in the plurality of core slots: and
a plurality of end turns connecting the plurality of core segments, the end turns at least partially disposed outside of the first axial end and/or the second axial end of the rotor core;
an end plate disposed at at least one of the first axial end or the second axial end, the end plate including:
a plate portion; and
a plurality of wedge ends extending from the plate portion, each wedge end of the plurality of wedge ends disposed at a corresponding core slot of the plurality of core slots, the end plate supportive of the plurality of end turns of the rotor winding;
a plurality of wedges, each wedge disposed in a core slot of the plurality of core slots and supportive of the plurality of core segments of the rotor winding;
wherein the wedge includes a cooling flow channel to direct a cooling fluid through the wedge;
wherein the end plate includes a plurality of fluid passages, each fluid passage extending through a wedge end to fluidly connect the fluid passage to the cooling flow channel.

6. The rotor assembly of claim 5, wherein the end plate includes a fluid manifold connected to the plurality of fluid passages to distribute the cooling fluid to the plurality of fluid passages.

7. A generator comprising:
a stator including a stator winding;
a rotor assembly defining an air gap between the rotor assembly and the stator, the rotor assembly rotatable about a central axis, the rotor assembly including:
a rotor core including a plurality of core poles defining a plurality of core slots therebetween, the plurality of core poles extending from a first axial end of the rotor core to a second axial end of the rotor core, opposite the first axial end;
a rotor winding installed to the rotor core, the rotor winding having:
a plurality of core segments disposed in the plurality of core slots: and
a plurality of end turns connecting the plurality of core segments, the end turns at least partially disposed outside of the first axial end and/or the second axial end of the rotor core; and
an end plate disposed at at least one of the first axial end or the second axial end, the end plate including:
a plate portion; and
a plurality of wedge ends extending from the plate portion, each wedge end of the plurality of wedge ends disposed at a corresponding core slot of the plurality of core slots, the end plate supportive of the plurality of end turns of the rotor winding;
a plurality of wedges, each wedge disposed in a core slot of the plurality of core slots and supportive of the plurality of core segments of the rotor winding;
wherein the plurality of wedges are formed from a first material, and the end plate is formed from a second material different from the first material.

8. The generator of claim 7 wherein the wedge end has a different axial cross section than the wedge.

9. The generator of claim 7, wherein the wedge includes a cooling flow channel to direct a cooling fluid through the wedge.

10. The generator of claim 9, wherein the end plate includes a plurality of fluid passages, each fluid passage extending through a wedge end to fluidly connect the fluid passage to the cooling flow channel.

11. The generator of claim 10, wherein the end plate includes a fluid manifold connected to the plurality of fluid passages to distribute the cooling fluid to the plurality of fluid passages.

12. The generator of claim 7, wherein the plurality of wedges are formed from an aluminum material.

13. The generator of claim 7, wherein the end plate is formed from one of a titanium or steel material.

* * * * *